United States Patent [19]

Briggs

[11] Patent Number: 5,458,346
[45] Date of Patent: Oct. 17, 1995

[54] KEYLESS SAW BLADE CHUCK

[76] Inventor: William L. Briggs, 19 Philip Dr., Storrs, Conn. 06268

[21] Appl. No.: 173,980

[22] Filed: Dec. 28, 1993

[51] Int. Cl.[6] .................................... B27B 19/09
[52] U.S. Cl. ................. 279/97; 30/339; 30/392; 83/699.21; 403/324
[58] Field of Search ............... 279/86, 97; 30/337–339, 30/351, 392–394; 83/699.21; 403/324, 328

[56] References Cited

U.S. PATENT DOCUMENTS

| | | |
|---|---|---|
| 2,411,028 | 11/1946 | Davies et al. ........................ 279/97 |
| 3,754,330 | 8/1973 | Anderson et al. . |
| 3,823,473 | 7/1974 | Hoffman . |
| 4,106,181 | 8/1978 | Mattchen . |
| 4,243,342 | 1/1981 | Marto ........................................ 403/328 |
| 4,594,781 | 6/1986 | Hoffman . |
| 4,684,182 | 3/1987 | Hoffman . |
| 4,803,112 | 4/1989 | Palm . |
| 4,864,727 | 9/1989 | Chu . |
| 5,000,614 | 3/1991 | Walker et al. . |
| 5,122,007 | 6/1992 | Smith . |
| 5,324,052 | 6/1994 | Ortmann ........................................ 279/97 |

FOREIGN PATENT DOCUMENTS 772079  4/1957  United Kingdom .

Primary Examiner—Steven C. Bishop
Attorney, Agent, or Firm—McCormick, Paulding & Huber

[57] ABSTRACT

A keyless saw blade chuck has a generally cylindrical collar receiving the blade attachment end of a tool shaft, a clamping member and a mounting portion of a saw blade. The clamping member is located within the collar and urges a received saw blade against the tool shaft. A bore extends transversely through the collar and supports a slideable lock pin for holding the collar and the saw blade on the tool shaft.

13 Claims, 2 Drawing Sheets

5,458,346

KEYLESS SAW BLADE CHUCK

BACKGROUND OF THE INVENTION

The present invention relates to a chuck for attaching and removing a saw blade to the tool shaft of a power saw, and more particularly to a keyless saw blade chuck for securing the saw blade to the tool shaft of the saw.

Different types of saw blade chucks have been employed in the past. One well-known type includes a threaded set screw which secures the blade either by clamping the blade to the tool shaft or by passing the screw through a mounting hole in the saw blade directly into the tool shaft. This type of apparatus requires a key to release and insert the saw blade into the chuck.

Other chucks do not require a key or other tool. One such chuck is disclosed in U.S. Pat. No. 4,106,181 and has a camming member to hold a saw blade against the tool shaft. The camming member engages the saw blade either directly or by means of an intermediate member. The chuck also has a pin for preventing relative axial movement of a saw blade and the tool shaft, and a shaft aligned with a notch on the received saw blade. The pin is aligned with and projects slightly into a hole in the received portion of the saw blade. This chuck also includes a lock mechanism to retain the camming member in a closed or blade holding position while the saw is in use.

Another type of keyless saw blade chuck is disclosed in U.S. Pat. Nos. 4,594,781 and 4,470,196. This type of chuck, however, merely holds the blade by clamping. Given the axial reciprocation of the tool shaft, the blade may tend to slip out of the chuck during use.

Still another type of keyless saw blade chuck is disclosed by U.S. Pat. No. 3,823,473. One embodiment of the chuck comprises a member carrying an axially slideable sleeve. The member provides a pair of spaced apart pins which mate with a pair of holes in the mounting end of the saw blade. The sleeve provides grooves for receiving the pins, and is biased by a spring into a closed position in which the sleeve covers and holds the mounting end of the saw blade on the pins.

The chucks described above are deficient in different manners. Chucks of the type utilizing a set screw are prone to problems such as the screw vibrating loose during use or the loss of the key necessary to loosen the set screw for insertion or removal of a saw blade. As noted above, chucks of the type utilizing a camming member and lock mechanism can be susceptible to the saw blade sliding out of the holder or to failure of the lock mechanism. Moreover, these chucks do not adequately allow for saw blades of different thicknesses. It would be advantageous to have a device which overcomes these problems.

It is accordingly an object of the present invention to provide a chuck for attaching a saw blade to a tool having an axially reciprocating tool shaft which eliminates the need for a separate key to remove or to attach a saw blade to the tool shaft. It is also an object of the present invention to provide a chuck which securely holds an attached saw blade in such a manner that the blade cannot slip out of the chuck while in use. It is a further object of the present invention to provide a chuck which is capable of receiving saw blades of various thicknesses.

SUMMARY OF THE INVENTION

The present invention resides in a keyless saw blade chuck for securing a saw blade to a power tool having an axially reciprocating tool shaft which is mounted on the tool shaft, and which also provides a passage for receiving a portion of a saw blade. The saw blade typically includes an end portion which is specifically intended for mounting, characterized by one or more securing holes and an absence of saw teeth. The collar includes a bore transverse to and communicating with the passage. This transverse bore is provided through the collar to mate with a securing hole of a saw blade received in the passage.

Clamping means are also provided for clamping the mounting end of a saw blade within the passage. The clamping means are located within the collar.

A lock pin is slideably mounted in the transverse bore of the collar. The lock pin is slideable between first and second positions. In the first position, the lock pin projects at least through the transverse bore of the collar and into the securing hole in the mounting end of a saw blade. In the second position, the lock pin is withdrawn at least from the securing hole of the saw blade to allow for the removal or insertion of the saw blade.

Retaining means are included for selectively retaining the lock pin in the transverse bore of the collar in either the first position or the second position.

The chuck of the present invention differs from the prior art discussed above in that while the saw blade is secured by a pin projecting into the securing hole of a saw blade, no key or additional tool is necessary to insert or remove the saw blade. In addition, the feature of the chuck of the present invention which allows for use of blades of various thicknesses also inhibits vibration.

DESCRIPTION OF THE PREFERRED EMBODIMENTS

Figure 1:
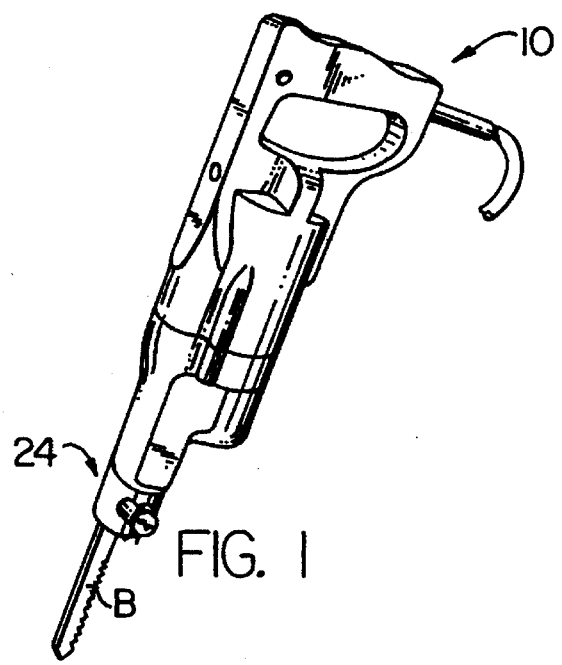
FIG. 1 is a perspective view showing a hand held saw embodying the present invention.
Figure 2:
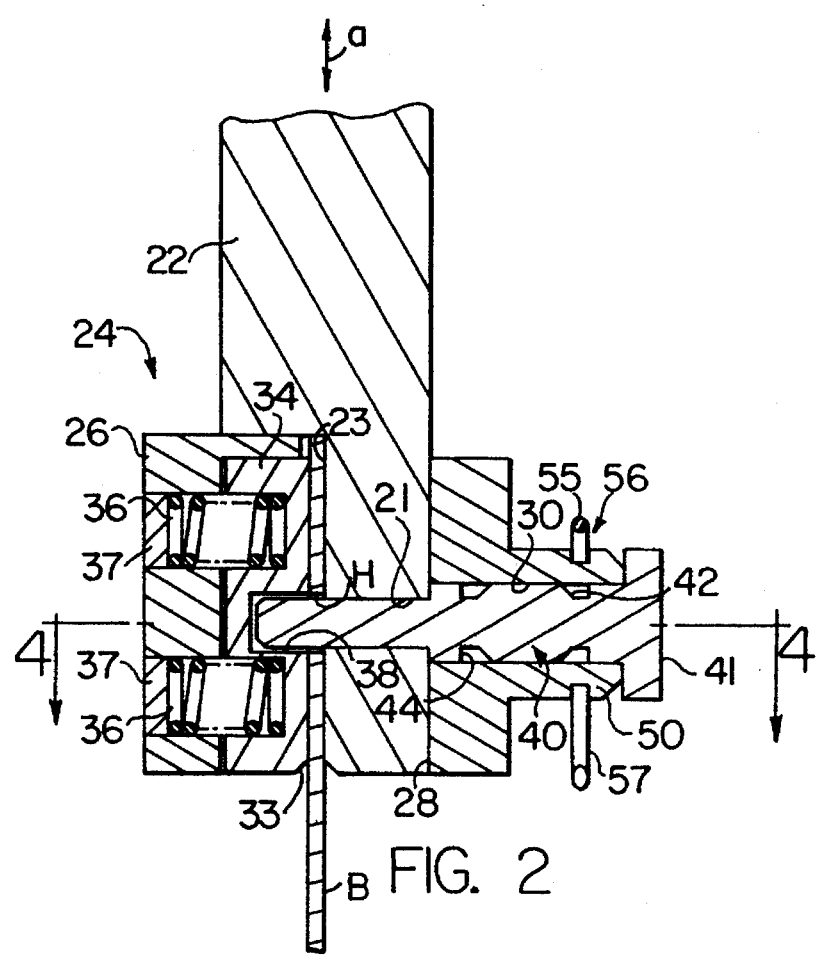
FIG. 2 is a longitudinal cross-section showing a chuck mounted on the attachment end of a tool shaft of a saw, in accordance with the present invention, and with the lock pin in a first, inserted position within the mounting portion of a saw blade.

FIG. 1 shows the chuck of the present invention, generally designated 24, attached to a hand held power saw 10. The saw includes a tool shaft 22 to which the chuck 24 is attached, as best seen in FIG. 2. The saw 10 also includes a motor or mechanism for axially reciprocating the tool shaft 22 in a direction indicated by the arrow a. The tool shaft 22 includes an attachment end, which typically has a semi-cylindrical shape that defines a flat mounting surface 23 for a saw blade B. The tool shaft 22 also has a bore 21 which is oriented transverse to the tool shaft 22 and extends through the attachment end of the shaft to the mounting surface 23.

The chuck 24 includes a mounting collar 26 for mounting the chuck on the attachment end of tool shaft 22. The collar 26 receives therein the attachment end of tool shaft 22, as well as the mounting end of a saw blade B. While separate recesses may be used to receive the tool shaft and a saw blade, the preferred embodiment provides a single recess, or through passage 28, for receiving both. The collar 26 also has a bore 30, which is transverse to and communicates with the through passage 28. The transverse bore 30 is located on the collar 26 so that it mates with the transverse bore 21 of the tool shaft 22 when the chuck 24 is mounted on the attachment end of the tool shaft.

The chuck 24 also includes clamping means located within the through passage 28 for urging the mounting end of a received saw blade B toward the mounting surface 23 of the tool shaft 22 when collar 26 is mounted on the attachment end of tool shaft 22. The clamping means, which in the preferred embodiment includes a semi-cylindrical clamping member 34 and coil springs 36,36 set by screws or plugs 37,37, serves to hold the blade B temporarily during installation and prevents the saw blade from twisting relative to collar 26 and tool shaft 22 when the saw is secured and in use. The clamping member 34 also has a beveled front edge 33 which, together with a mating beveled edge on the tool shaft 22 facilitates the insertion of a saw blade B into the through passage 28 between the clamping member and shaft. The springs 36,36 and the clamping member 34 permit the slot in which the saw blade is held to vary in width, and thereby accommodate saw blades of various thicknesses. The clamping means also serves to inhibit vibration of an inserted saw blade.

The chuck 24 further includes a lock pin 40 which is slideably mounted and selectively moveable within the transverse bore 30 of collar 26 between first and second positions. The lock pin 40 prevents relative axial motion between a received saw blade B, the chuck 24, and the axially reciprocating tool shaft 22. When the lock pin is in the first position, shown in FIG. 2, the pin projects at least through the transverse bore 30 of collar 26 and the transverse tool shaft bore 21 and into a securing hole H of the received saw blade B. To further secure the saw blade within the chuck 24, clamping member 34 may provide a recess 38, which mates with the bores, so that lock pin 40 projects through the securing hole H of the saw blade and into the recess 38.

The collar 26 includes a lock pin housing 50, which supports the lock pin 40. The housing 50 extends outwardly from the cylindrical portion of the collar 26, and the bore 30 extends through the housing. The lock pin housing 50 provides at least one cutout 52, shown in FIG. 4, which communicates with transverse bore 30 and provides access to the lock pin 40.

Figure 4:
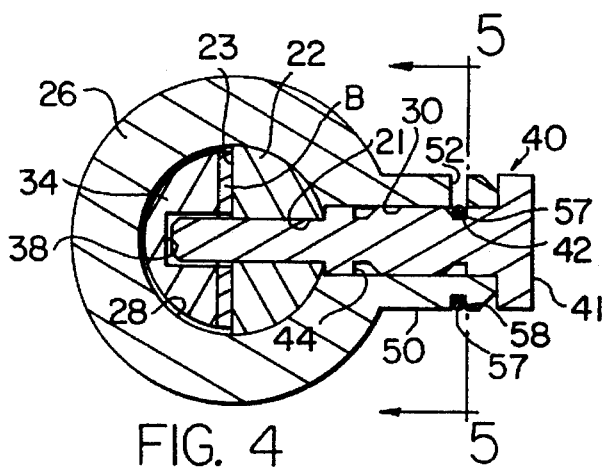
FIG. 4 is a cross-sectional view of the chuck taken along sectioning line 4—4 of FIG. 2.

The lock pin 40 is symmetrical about its longitudinal axis and includes a first detent 42 which mates with cutout 52 when the pin is in the first position, as shown in FIG. 4. The lock pin 40 has a chamfer at a first location adjacent the first detent 42 and between the first detent 42 and second detent 44 to facilitate movement of lock pin 40 from the first position to the second position.

Figure 3:
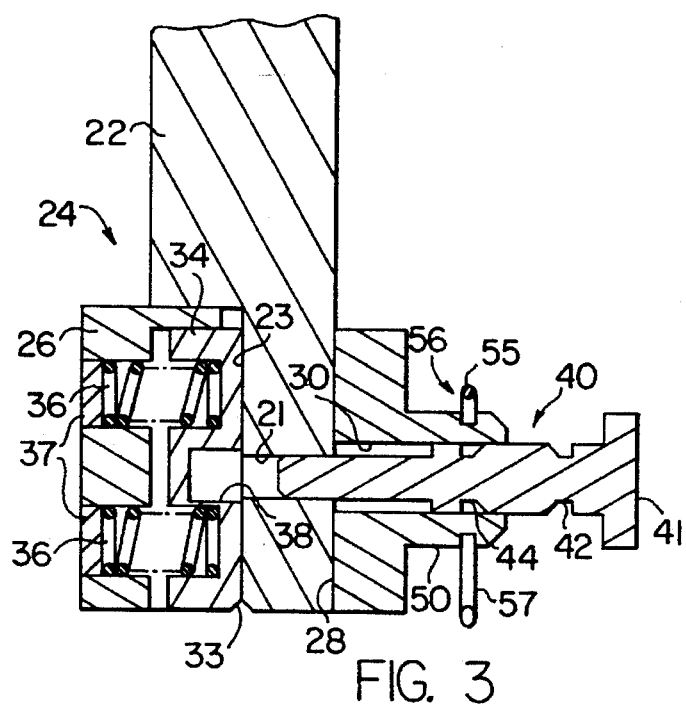
FIG. 3 is a cross-sectional view as in FIG. 2, with the lock pin in a second, retracted position and the saw blade removed from the chuck.

The lock pin 40 also includes a second detent 44 which mates with the cutout 52 when the lock pin 40 is in the second position, as shown in FIG. 3. In the second position, the lock pin is withdrawn at least from the recess 38 of clamping member 34 and from the securing hole H of saw blade B. The lock pin has a chamfer at a second location adjacent the second detent 44 and between the first detent 42 and second detent 44 to facilitate movement of lock pin 40 from the second position to the first position. With the pin withdrawn from the securing hole, a saw blade may be withdrawn from or inserted into the collar 26. In the absence of a saw blade in the through passage 28, springs 36,36 bias the clamping member 34 against the mounting surface 23 of the attachment end of the tool shaft 22, upon which collar 26 is mounted. By further withdrawing the lock pin 40 from the transverse tool shaft bore 21, the chuck 24 may be removed from, or attached to, the attachment end of tool shaft 22.

Figure 5:
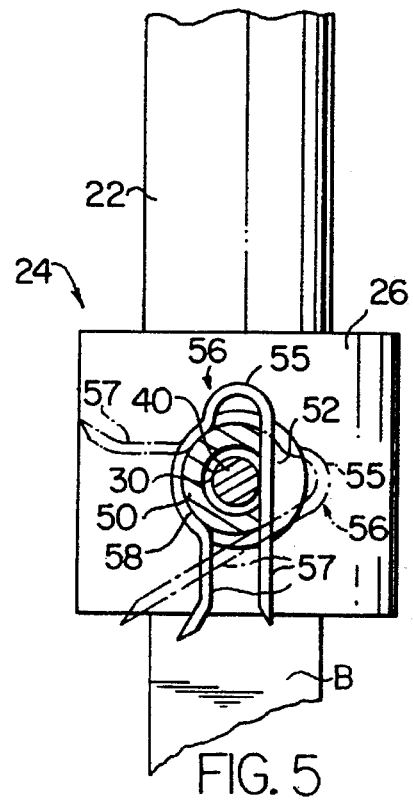
FIG. 5 is a cross-sectional view of the chuck as seen along the sectioning line 5—5 of FIG. 4.

FIG. 4 shows the retaining means for selectively retaining the lock pin 40 in the transverse bore 30 of the collar 26 in the first and second positions. In the preferred embodiment, the retaining means comprise a spring clip 56 which includes a head 55 and a pair of legs 57,57 as shown in FIG. 5. Other suitable means may be employed. The spring clip is clipped on the collar so that legs 57,57 straddle the lock pin housing 50 at an annular groove 58 which intersects the cutout 52. To retain the lock pin 40 in the first position within the transverse bore 30, the spring clip is positioned on the housing such that one of the legs 57,57 engages the first detent 42 as shown in the solid line position of the clip in FIG. 5.

The lock pin 40 may be slideably moved from the first position into the second position within the bore 30 by pulling the lock pin head 41 until the second detent 44 is aligned with the cutout 52. The lock pin 40 is moved from the second position into the first position by pushing lock,pin head 41 until the first detent 42 is aligned with the cutout 52 and engages a leg 57 of the spring clip 56.

Alternatively, the lock pin 40 may be slideably moved to the second position within the bore 30 by rotating the spring clip 56 about the lock pin housing 50, as shown in phantom in FIG. 5, such that neither of the legs 57,57 engages the first detent 42 through the cutout 52. When the pin 40 is shifted into the second position and the second detent 44 is aligned with the cutout 52, the lock pin 40 may be held in such position by rotating the spring clip so that one of the legs 57,57 engages the second detent 44 in a manner similar to that shown in FIG. 5.

Figure 6:
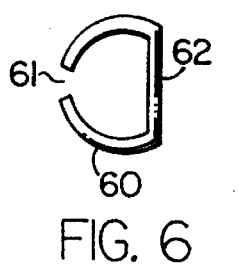
FIG. 6 is a view showing an alternative spring clip for the spring clip shown in FIG. 5.

In FIG. 6, an alternative spring clip 60 is shown as generally "D" shaped corresponding to annular groove 58 of the housing 50 at the cutout 52. The spring clip 60 has a split 61 which allows the spring clip 60 to flex and be installed and rotated in the annular groove 58 of the housing 50. When the straight segment 62 of the spring clip 60 is rotated into the cutout 52, the lock pin is secured in position.

Figure 7:
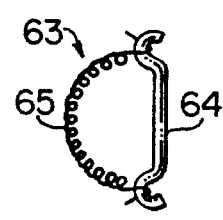
FIG. 7 is a view showing still another alternative spring clip for the spring clip shown in FIG. 5.

Another alternative spring clip 63 is shown in FIG. 7. The spring clip 63 includes a straight segment 64 with hooks at each end connected to a coil spring portion 65. The coil spring portion 65 expands to allow the spring clip 63 to be installed and rotated in the annular groove 58. The lock pin is secured in position when the straight segment 64 is rotated into the cutout 52.

As a still further alternate embodiment, the retaining means may comprise a spherical ball and spring assembly which is located within the cutout 52. This assembly replaces the spring clip and allows for movement of the lock pin 40 between first and second positions by pulling or pushing on the lock pin head 41 to move lock pin 40 into either the first or second position.

From the foregoing, a novel keyless saw blade chuck has been disclosed in detail. However, numerous modifications and substitutions may be made with respect to the specifically disclosed embodiments without departing from the spirit of the invention or its scope as defined by the appended claims. Accordingly, the present invention has been described by way of illustration rather than by way of limitation.

I claim:

1. A keyless saw blade chuck for attaching a saw blade to a power tool having an axially-reciprocating tool shaft with a blade attachment end, the chuck comprising:

a mounting collar for mounting on the attachment end of a tool shaft and having a passage receiving the mounting end of a saw blade when the collar is mounted on the tool shaft, the collar also including a bore extending transverse to and intersecting the passage to mate with a securing hole in the mounting end of a saw blade inserted into the passage;

clamping means fitting within the collar for clamping the mounting end of a saw blade within the passage of the collar;

a lock pin slideably mounted in the transverse bore of the mounting collar and slideable between a first position in which one end of the pin projects through the bore of the collar and into the securing hole in the mounting end of a saw blade to secure the blade within the collar, and a second position in which the one end of the pin is withdrawn at least from the securing hole of a saw blade to remove and insert a saw blade in the collar; and retaining means for selectively retaining the lock pin within the bore of the collar in the first position and the second position.

2. The keyless saw blade chuck of claim 1 wherein:

the passage of the collar is a through passage for mounting the collar on the blade attachment end of the tool shaft; and the slideably mounted lock pin passes through a transverse bore in the blade attachment end of the shaft in the first and the second positions to secure the collar on the shaft.

3. The keyless saw blade chuck of claim 2 wherein the lock pin is further slideable in the bore of the collar to remove the pin entirely from the blade attachment end of the shaft for removal of the collar from the shaft.

4. The keyless saw blade chuck of claim 1 wherein the clamping means has a clamping member containing a recess to mate with the transverse bore of the collar, and in the first position of the lock pin the one end of the pin projects into the cutout.

5. The keyless saw blade chuck of claim 1 wherein the collar has a lock pin housing extending outwardly away from the clamping means, and the transverse bore also is extending through the lock pin housing.

6. The keyless saw blade chuck of claim 5 wherein the lock pin housing of the collar is cylindrically-shaped and has a cutout penetrating to the transverse bore;

the lock pin has a first detent to mate with the cutout when the pin is in the first position, and a second detent to mate with the cutout when the pin is in the second position; and the retaining means engages the lock pin detents through the cutout.

7. The keyless saw blade chuck of claim 6 wherein the lock pin has a first chamfered portion located adjacent the first detent and between the first detent and the second detent; and a second chamfered portion located adjacent the second detent and between the first detent and the second detent.

8. The keyless saw blade chuck of claim 1 wherein the retaining means comprises a spring clip.

9. The keyless saw blade chuck of claim 2 wherein the through passage has a cylindrical shape.

10. The keyless saw blade chuck of claim 2 wherein the clamping means is located within the through passage and generally opposite of the transverse bore of the collar, whereby the collar receives the attachment end of a tool shaft between the clamping means and the transverse bore of the collar.

11. The keyless saw blade chuck of claim 1 wherein the clamping means provides a generally planar surface for engaging a saw blade.

12. The keyless saw blade chuck of claim 10 wherein the planar surface of the clamping means is generally perpendicular to the slideably mounted lock pin.

13. The keyless saw blade chuck of claim 6 wherein the retaining means comprises a spring clip having a straight segment to mate with the cutout.

* * * * *